UNITED STATES PATENT OFFICE.

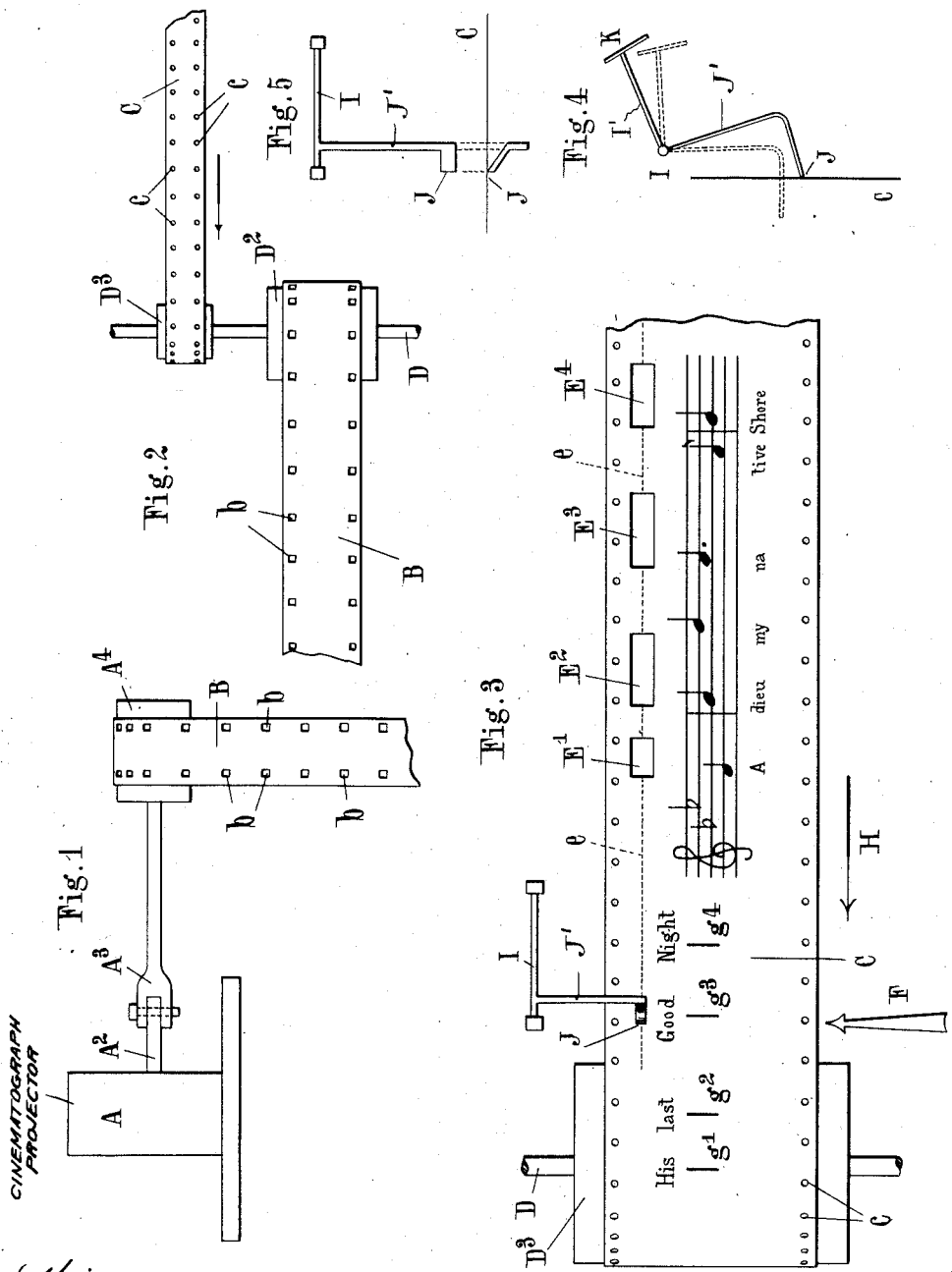

JEAN-JOSEPH MOUIS, OF CHÂLON-SUR-SAÔNE, FRANCE.

CINEMATOGRAPHIC APPARATUS.

1,192,094.  Specification of Letters Patent.  Patented July 25, 1916.

Application filed June 10, 1911. Serial No. 632,515.

*To all whom it may concern:*

Be it known that I, JEAN-JOSEPH MOUIS, a citizen of the Republic of France, residing at Châlon-sur-Saône, France, have invented new and useful Improvements in Cinematographic Apparatus, of which the following is a specification.

The object of this invention is to provide a device which will synchronize an animated view, *i. e.* synchronize a film movement with any other device or apparatus mechanically controlled. The present system synchronizes the living picture with; 1° words spoken by living impersonators or readers; 2° music sung by living singers, or executed by any number of living instrumentalists; 3° any automatic instrument; 4° a living chorus and orchestra; 5° the phonograph or gramophone or any similar device; 6° any scenic incident; 7° electioneering addresses; etc.

In the drawings, Figure 1 is a detail elevation showing a sprocket wheel connected with the projector handle axis and controlling the long band or belt connecting the projector and the synchrone band; Fig. 2 is a detail view showing two sprocket wheels on the same axis, one being controlled by the propelling band, and the other controlling the synchrone band; Fig. 3 is a detail elevation showing the synchrone band, the index and the time-beater; Fig. 4 is a side view of the time-beater; Fig. 5 is a detail view of the time-beater seen in Fig. 3 detached.

In Fig. 1, A is a cinematograph projector, with its handle axis $A^2$. The handle being removed, an additional length of axis $A^3$ is keyed on $A^2$. At the end of $A^3$ is mounted a sprocket-wheel $A^4$ the periphery of which has a double ring of pins—not seen on the drawing—which pins are caught by the perforations $b\ b\ b\ b\ b$, of a band B. This band is made of very thin, and consequently very flexible, steel. B and B connects the cinematograph projector with a device represented by Fig. 2 and placed behind the screen. On axis D are mounted two sprocket-wheels $D^2$, $D^3$, similar to $A^4$ (Fig. 1). Sprocket $D^2$ engages the perforations of B, and $D^3$ the perforations $c\ c\ c\ c$, of a second band C similar to B, but made of any resisting and inextensible material.

B in Fig. 1 and B in Fig. 2 are two parts of one and the same complete belt, called the propelling band synchronizing the cinematographic axis—by which the film movement is controlled—and axis D. The diameters of $A^4$, $D^2$ and $D^3$ are so calculated as to give C a speed—in a constant ratio with that of axis D—allowing the easy reading of signs, words or musical notes written on band C. The latter is called "synchrone band". Any motor may apply its power either on axis $A^3$, or D, or on a sprocket-wheel engaging conveniently the perforations $b\ b\ b\ b$, on band B. Band B is conducted through the cinematograph hall by friction rollers conveniently located in order to obtain, for B, any useful direction.

Fig. 3 shows a detail of the synchrone band C. On this band are written words, each syllable, or accented syllable, being represented by a mark $g^1\ g^2\ g^3\ g^4$. Or there may be music, in which case each beat or important beat is marked by a perforation such as $E^1$, $E^2$, $E^3$, ... of a special kind. The band moves in the direction indicated by arrow H. There is, in some fixed position, an index F before, or under, or over which the words or signs pass on the band. When one of these marks $g^1$, or $g^2$, ... passes above F the corresponding syllable is to be pronounced. Thus, when $g^2$ is over F, the word "last" is to be said.

In the case of music, the special perforations pass under a hinged index shown by Figs. 3, 4 and 5. The time beater consists of two arms $I'$, $J'$ arranged at right angles to each other and having a horizontal projection I which is pivotally mounted upon any suitable support. The time beater is so arranged that the end J of arm $J'$ will lie against the face of the band C in line with the perforations $E'$, $E^2$, etc. The outer or free end of arm $I'$ is provided with an indicator K made of some showy material, as white card-board, paper, or the like, whereby the beats of the index or time beater are rendered more clearly visible. The end J is bent to one side in the direction that the band travels, so that said end may successively drop into the various perforations of the band to cause the beats by the time beater, and to be pushed out of each perforation by the pressure upon said end J of the rear edge of the perforation as the band continues to travel. The point J of this index follows the dotted line $e\ e\ e$. When it meets a perforation, the whole system rotates around I (Fig. 4). The indicator K falls a little indicating a beat. When the perforation ends the end J of the time beater is pushed out of the perforation thus raising the time beater and said end J again bears on the face of the band.

The first perforation of each bar should be made longer than the others to give the time beater a longer rest when down, in order to indicate the beginning of the bar more distinctly and help the instrumentalist who reads the synchrone band. Time beating by a living conductor is of course more expressive and diversified than it can be with a mechanical time beater as in the present case. A longer rest for the first beat will preclude errors on the beats of one and the same bar, which is an advantage.

The time-beater allows an instrumentalist to play his music in perfect synchronism with the view or the conductor of an orchestra to beat time so as to obtain a synchronized execution.

The synchrone band is obtained as follows. Everything being ready for taking the view and synchronizing, a second operator is to order all motions and conduct the music. The starting point of the film and that of the synchrone band being well marked, the second operator loudly commands the singing or other music, saying "one, two, three, four, one, two, three, four," etc., or "one, two, three, one, two, three", etc., as the case may be. At each beat-number thus uttered, he marks by means of a convenient device a distinct sign on the synchrone band as it is driven along by the synchronizer. All the marks are afterward reviewed; words are written or the proper perforations made. At the beginning of the regular performance the starting mark on the film being placed in its right position, the starting sign on the band C is placed opposite index F (Fig. 3) or under the point J of the time-beater (Fig. 4). In order to synchronize words simply spoken it is necessary to give them a rhythmic order or arrangement. In fact, they are prepared, written and arranged under a musical staff as if they were to be sung, but with the proper conversational rhythm.

The synchrone band may be placed in any part of the hall to suit all requirements.

Claim:

In a cinematographic apparatus, the combination with a projector, and a film containing pictures, of a synchrone band bearing musical characters, a word syllable arranged opposite each of said characters, said band having perforations corresponding to such characters as described, said characters being arranged on the band so as to synchronize with the pictures on the film, synchronizing propelling devices intermediate the said band and the projector, and a pivotal time-beater arranged adjacent the band and adapted to be operated and controlled by the perforations in said band, as set forth.

In testimony whereof I affix my signature in presence of two witnesses.

JEAN-JOSEPH MOUIS.

Witnesses:
M. CLAUDE MARIE FRANCOIS CHAROLAY,
M. EUGENE LACHAUP.